July 28, 1959
F. MAST ET AL
2,896,507
ARRANGEMENT FOR AMPLIFYING THE LIGHT INTENSITY
OF AN OPTICALLY PROJECTED IMAGE
Filed April 6, 1953
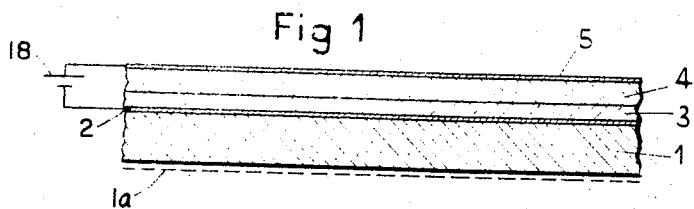
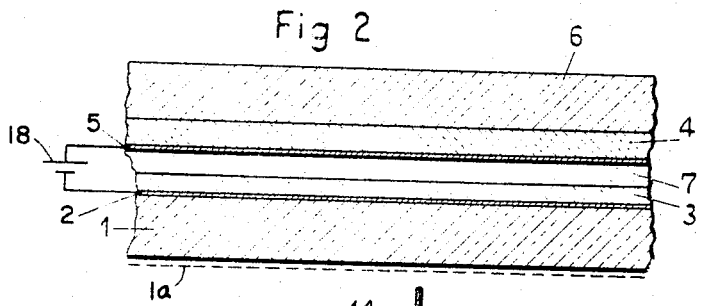
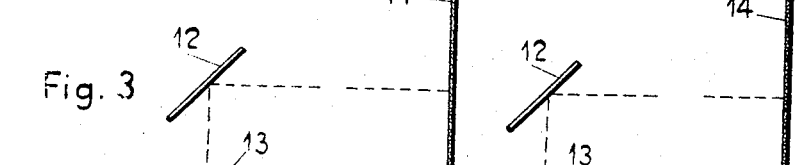
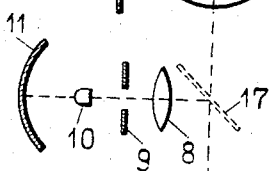
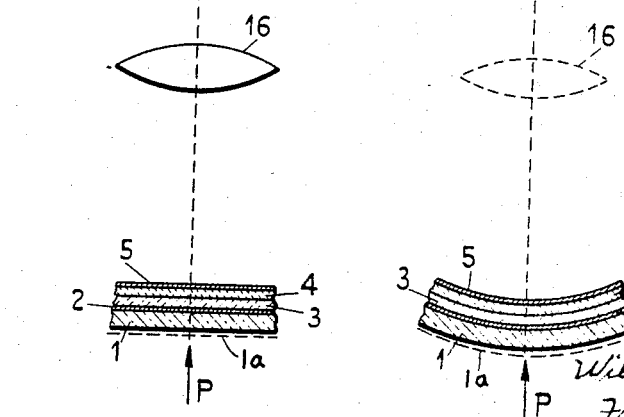
Inventors:—
Fred Mast,
Willy Baumgartner,
Fritz Held,
Ernst Baumann,
by Pierce, Scheffler & Parker,
Attorneys.

2,896,507

ARRANGEMENT FOR AMPLIFYING THE LIGHT INTENSITY OF AN OPTICALLY PROJECTED IMAGE

Fred Mast, Willy Baumgartner, Fritz Held, and Ernst Baumann, Zurich, Switzerland, assignors to Gesellschaft zur Forderung der Forschung an der Eidg. Techn. Hochschule, Zurich, Switzerland Application April 6, 1953, Serial No. 346,856

Claims priority, application Switzerland April 16, 1952

7 Claims. (Cl. 88—61)

Up to the present the following basic methods have existed for increasing the light intensity of a projected image:
(1) Photography with subsequent projection.
(2) Transmission of the image with television pickup unit and corresponding reproduction system.
(3) Electronic image converter.

The invention relates to arrangements of the type in which a control layer in a schlieren-optical system modulates by its deformation, produced by and corresponding to the modulation of light in an optically projected image, the light of a separate light source of an intensity much higher than that of the optically projected image. In such manner the light intensity of the optically projected image may thus be said to have been "amplified." Such control devices are as to their general lines described, for instance in the Swiss patent specifications 230,613 and 224,686 and also United States Letters Patent Nos. 2,391,450 and 2,391,451, Fischer, and No. 2,644,938, Hetzel et al.

Whereas in the arrangements and methods of the aforementioned type the forces necessary for deforming the control layer are brought about by electric charges applied to its surface, according to the present invention a novel control means is proposed which, in its essence, includes a combination of a light-sensitive i.e. a photoconducting layer and a deformable layer with a mirror layer. Further features of the invention will appear from the claims, disclosure and drawing, the latter representing diagrammatically and not to scale some preferred forms of the arrangement according to the invention.

Fig. 1 is a sectional view of a formation of the multiple layer control means;

Fig. 2 is a sectional view of a modified formation of the multiple layer control means;

Fig. 3 represents the general arrangement with a flat multiple layer control means as in Fig. 1;

Fig. 4 is the general arrangement with a hollow spherically shaped multiple layer control means in the formation as in Fig. 1.

According to the form of embodiment as in Fig. 1, a glass carrier 1 has applied thereto an electrode 2 of a transparent, electrically conducting thin metallic layer, say of platinum. On this electrode 2 is a special light-sensitive i.e. a photo-conducting layer 3, say of selenium, copper-activated zinc-sulphide, etc., of a suitable thickness, whose physical characteristics such as light-sensitivity, dark current, di-electric constant, conductivity, light absorption and photo-electric time constant, are chosen according to the purpose. Said layer 3 is coated with an elastically deformable medium 4. The layer 4 may, for intance consist of a high polymer, such as polyvinylchloride, with plasticizer. The physical properties of said medium 4, such as the modulus of elasticity, internal friction, surface tension, conductivity, dielectric constant are suitably chosen. Superficially, the deformable layer 4 is provided with a metallic covering 5 which at the same time serves as mirror and as electrode. The layer 4 itself may be opaque, for instance painted black.

In the form of embodiment according to Fig. 2, the glass carrier 1 with metal, say platinum, electrode 2, has the photo-conducting layer 3 thereon. On a separate glass carrier 6 is the elastically deformable medium 4 with metallic mirror 5. As shown in Fig. 2, both glass carriers 1 and 6 are located opposite to one another at such a distance apart so that the electrical field in layer 3, produced by the distribution of the infalling light, also has an influence on the electric field at the surface of layer 5. For example the distance may amount to 30µ. The space between layer 3 and mirror 5 allows the layers 4 and 5 to be deformed according to the acting electrostatical forces. It may be filled with a gaseous intermediate layer 7; however, to obtain a higher electrical breakdown field strength in the layer 7, it is advisable to use a liquid having a high break-down field strength, with appropriate internal friction and electrical conductivity, instead of the above mentioned gas.

The use of such a liquid, e.g. benzene with addition of suitable electrolytes, allows the supply of a high electrical voltage between layers 2 and 5 and therefore increases the efficiency of the arrangement.

Both forms of the multiple layer control means may be carried out in flat arrangement (Figs. 1 and 2) as well as in a convex form, say as hollow spherical segment (Fig. 4). The carrier 1 and, in given cases, also carrier 6 may be arranged for cooling, say by placing the carrier in a water bath under cold water circulation, or by having it air cooled.

For certain applications the mirror layer 5 may be done away with, provided the reflecting capacity of the deformable layer 4 is sufficiently high. In such cases a transparent electrode is required which no longer need be in contact with the deformable layer.

The modus operandi with reference to the whole arrangement is disclosed hereinafter. The schlieren-optical system according to Fig. 3 including schlieren-objective 16, bar system 17, condensing lens 8, image window 9 and light source 10 (say, arc lamp) with reflector 11 is so provided that, with flat mirror 5, all light from the light source 10 reflected by the mirrored surfaces of the bars 17 onto the flat mirror 5 is reflected back along the same path into the source 10. Consequently no light impinges between the bars 17 on the mirror 12 and consequently on the projection surface 14. Applied between the electrodes 2 and 5 is a direct or alternating voltage of any frequency. Suppose light of a luminescent point, optically projected on the layer 3 in the direction of arrow P, falls in, then at the location of the image point there will occur a change of the electrical resistance or of the dielectric constant of layer 3. This change precipitates a change of the electrical field strengths in the layers 3 and 4. The change of the electrical field strength on the surface of layer 4 induces at that point a change of the electrostatical forces and therefore causes a local deformation of the layer 4 and of the mirror layer 5 thereupon adhering. At this point the arc lamp light will be refracted or diffracted so that a part thereof falls through slits of the bar system 17 on the mirror 12 and therefore on the projection surface 14. The light of the arc lamp 10 therefore will be thrown on the screen 14 according to the light falling on layer 3 along P. There occurs a control of the light which falls on the screen 14 due to the mostly weak light falling in parallel to P. Owing to the light quantity falling on screen 14 being larger than the light quantity which falls in along P, the arrangement constitutes a light amplifier. For accurately imaging the mirror layer 5 on the screen 14, a correcting lens 13 is inserted.

The voltage applied between electrode layers 2 and 5 is illustrated schematically in Figs. 1 and 2 as a battery 18.

In order to control the light from the arc lamp 10 in a point-by-point manner, the image projected upon the photo-conducting layer 3 must be rastered i.e. divided up in a point-by-point manner in order to obtain an equivalent image on the screen 14. This may be done in many ways, for example immediately in front of the photo-conducting layer 3 or at another optically equivalent point. It may be done by means of an optical grid 1a included in the glass carrier 1.

Fig. 4 shows a modified general arrangement, whereby, in contradistinction to the arrangement as in Fig. 3, the control layer is designed hollow spherically, and therefore the schlieren objective 16 in the schlieren channel (and hence disturbing glass surfaces) may be let out.

The invention provides an arrangement which depends on the adoption of new principles for producing the control layer surface deformations necessary for the light control. The resulting simplifications in design and possibilities of applying the present arrangement are of great practical importance. The various applications include the following: Episcopic projection, large scale television projection, cinematograph projection with great light intensivity and image converters.

What we claim is:

1. Apparatus for amplifying the brightness of an optically projected image comprising a strong light source, means forming the light from said source into a beam with a high degree of brightness as compared with that of said projected image, a system for projecting said beam to a screen, a multiple layer control means interposed in said system between said light source and screen for modulating said beam in a point-to-point manner, said multiple layer control means including a first electrode layer permeable to light, a photo-conducting layer at one side of said first electrode layer, a second electrode layer spaced from said first electrode layer with said photo-conducting layer therebetween, a source of voltage for application to said electrode layers to produce an electric field therebetween, said photo-conducting layer being disposed within said electric field, means for projecting in a point-to-point manner said image to be amplified onto the side of said photo-conducting layer through said first electrode layer, and a deformable layer overlying said photo-conducting layer and having a mirrored surface at which said beam is reflected, said second electrode layer being disposed in such relation to said deformable layer and photo-conducting layer as to effect deformation of said deformable layer and the mirrored surface thereof by corresponding changes in said electric field produced solely by variations in brightness of the image projected onto said photo-conducting layer.

2. Apparatus as defined in claim 1 for amplifying the brightness of an optically projected image wherein said second electrode layer is applied to the surface of said deformable layer and constitutes also said mirrored surface for reflecting said beam.

3. Apparatus as defined in claim 1 for amplifying the brightness of an optically projected image wherein said multiple layer control means includes a fluid layer intermediate said photo-conducting layer and said deformable layer.

4. Apparatus as defined in claim 1 for amplifying the brightness of an optically projected image wherein said second electrode layer is applied to the surface of said deformable layer and constitutes also said mirrored surface for reflecting said beam, and which further includes a separate transparent carrier layer for said deformable layer and said second electrode layer.

5. Apparatus as defined in claim 1 for amplifying the brightness of an optically projected image wherein the several layers constituting said multiple layer control means are plane.

6. Apparatus as defined in claim 1 for amplifying the brightness of an optically projected image wherein the several layers constituting said multiple layer control means have the configuration of a hollow spherical segment.

7. Apparatus as defined in claim 1 for amplifying the brightness of an optically projected image and which further includes a transparent carrier layer provided for said photo-conducting layer and said first electrode layer, and said carrier layer includes an optical grid constituting part of said means for projecting said image onto the side of said photo-conducting layer in a point-to-point manner.

References Cited in the file of this patent

UNITED STATES PATENTS

| | | |
|---|---|---|
| 2,164,576 | Collins | July 4, 1939 |
| 2,281,637 | Sukumlyn | May 5, 1942 |
| 2,391,451 | Fischer | Dec. 25, 1945 |
| 2,457,981 | De Forest | Jan. 4, 1949 |
| 2,510,846 | Wikkenhauser | June 6, 1950 |
| 2,600,397 | Fischer | June 17, 1952 |
| 2,605,335 | Greenwood et al. | July 29, 1952 |
| 2,605,352 | Fischer | July 29, 1952 |
| 2,644,938 | Hetzel et al. | July 7, 1953 |

OTHER REFERENCES

Serial No. 354,771, Paehr (A.P.C.), published May 18, 1943.